Figure 1:
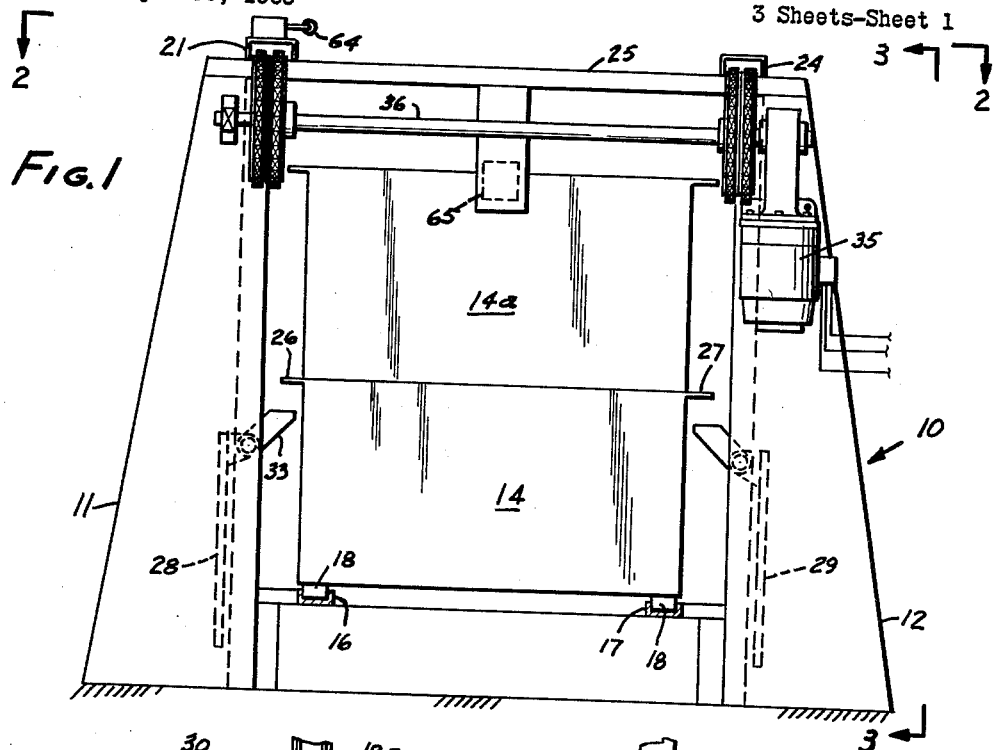

June 22, 1965

C. P. HOSTETLER 3,190,466

BIN STACKER AND DE-STACKER MECHANISM

Filed Sept. 18, 1963

3 Sheets-Sheet 1

INVENTOR.
CHARLES P. HOSTETLER
BY
ATTORNEYS.

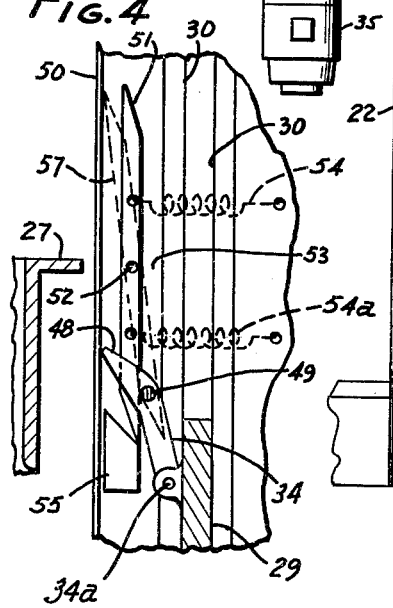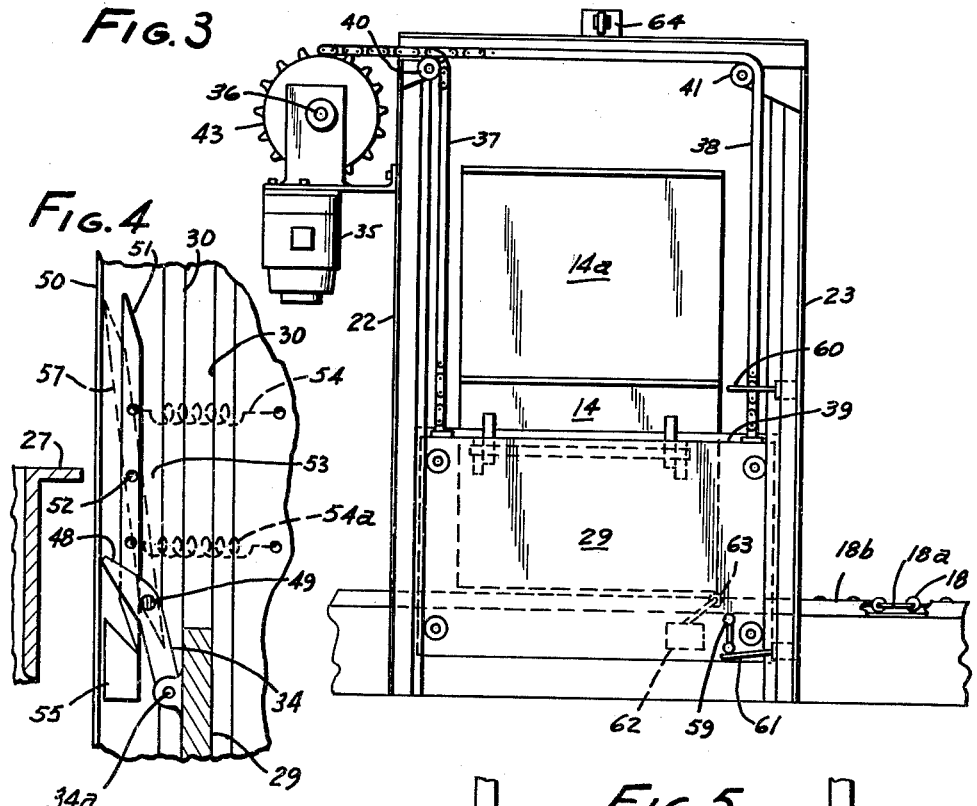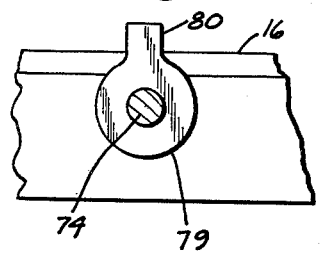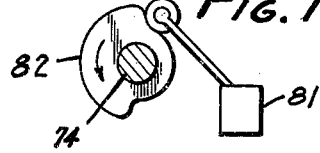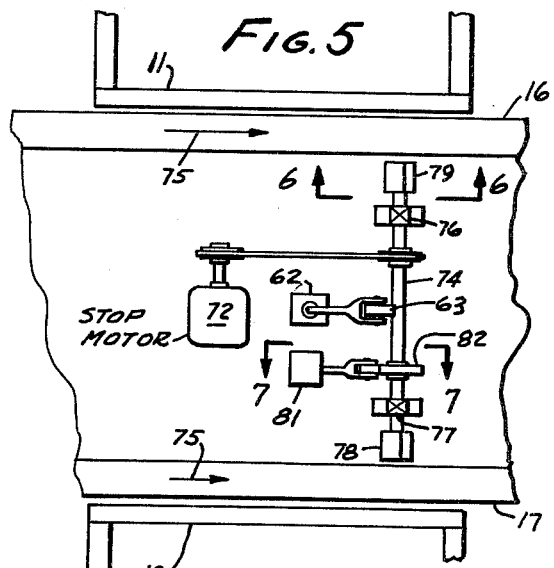
INVENTOR.
CHARLES P. HOSTETLER
BY
Angus & Mon
ATTORNEYS.

INVENTOR.
CHARLES P. HOSTETLER
BY
Angus & Mon
ATTORNEYS.

United States Patent Office 3,190,466
Patented June 22, 1965

3,190,466
BIN STACKER AND DE-STACKER MECHANISM
Charles P. Hostetler, Redlands, Calif., assignor to Fruit Equipment Service, Redlands, Calif., a corporation of California
Filed Sept. 18, 1963, Ser. No. 309,740
3 Claims. (Cl. 214—6)

This invention relates to a bin stacker and a bin de-stacker and more particularly to a bin stacker and de-stacker for use with a conveyor system.

In many industries goods and material are transported and handled in large bins. For example, in the citrus industry it is convenient out in the field to place the freshly picked fruit into bins. When the bins are filled with fruit, they are stacked up on the bed of a truck by a lifting means such as a fork lift, and then when the truck is loaded they are transported back to the packing house for further processing.

When the truck arrives at the packing house, the stacks of bins are off-loaded from the truck onto a conveyor which may, for example, be a conveyor as described in the application of Charles P. Hostetler, entitled "Conveyor Intersection," application Serial No. 263,761, filed March 8, 1963. The stacks are transported along the conveyor system to a point where the bins are de-stacked so that the bins are caused to ride one-high upon the conveyor. Downstream from the de-stack point on the conveyor system there may be a bin emptying means to empty the fruit from the bins such as, for example, the bin dumper described in Charles P. Hostetler et al., Patent 2,905,344, issued September 22, 1959.

It is an object of this invention to de-stack the bins before they are emptied of their fruit or material and to restack them again after they have been emptied.

A bin stacker and de-stacker according to this invention comprises two racks disposed on opposite sides of the conveyor. When de-stacking, a stack of bins move along a continuously moving conveyor and passes to a position between the racks where the conveyor is caused to stop. The upper bins above the bottom bins are raised by a lift means and the conveyor is started, causing the bottom bin to pass on from between the racks. The lift means then lowers the stack of the raised bins onto the conveyor. Following this it again lifts all but the lower-most bin. The conveyor starts again allowing the bin resting on the conveyor to pass on from between the racks. The operation herein described is continued until the last bin is then lowered to the conveyor and transported from between the racks.

To perform a stacking operation instead of the de-stacking operation, the procedure is reversed, in that the bins are stacked up when they pass from the bin stacker. Also in the bin stacking operation, the conveyor is caused to operate continuously and a stop means is employed to stop the bins so they may be stacked.

According to a preferred but optional feature of this invention, the bin stacking and the bin de-stacking operation may be automatically controlled. By employing the use of limit switches, the means to stop the bins and the lift means may be automatically operated in proper sequence so that the bins may be either stacked or de-stacked as they pass along the conveyor.

Figure 2:
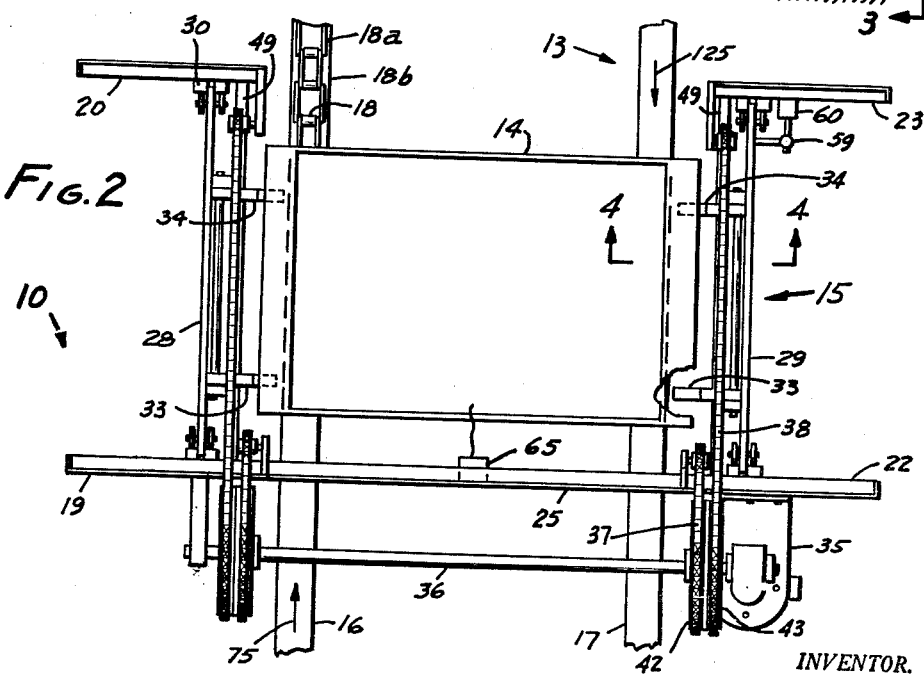
Figure 8:
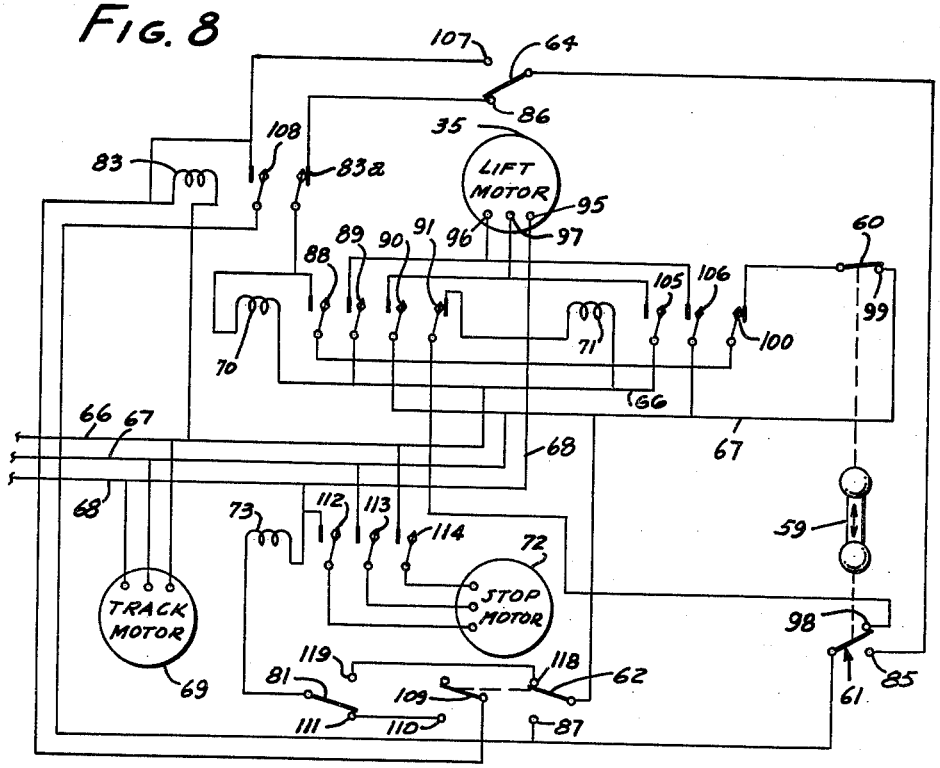
Figure 9:
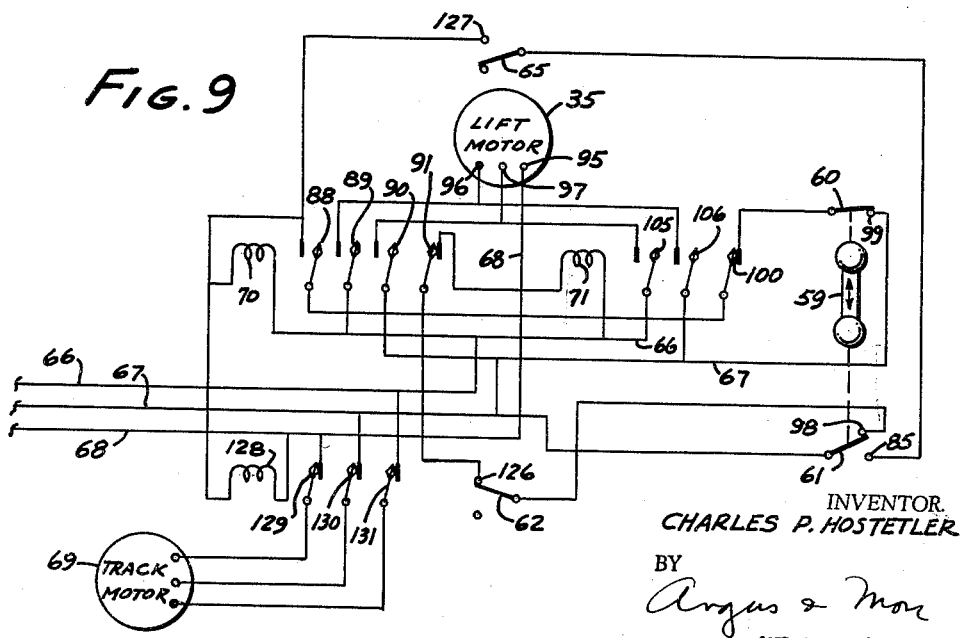

The above and other features of this invention will be more fully understood from the following detailed description and accompanying drawings in which:

FIG. 1 is a front view of a device in accordance with the invention;
FIG. 2 is a top view taken at line 2—2 of FIG. 1;
FIG. 3 is a side view taken at line 3—3 of FIG. 1;
FIG. 4 is a section view taken at line 4—4 of FIG. 2;
FIG. 5 is a view showing the control mechanism disposed between the tracks of the conveyor system of the bin stacker;
FIG. 6 is a section view taken at line 6—6 of FIG. 5;
FIG. 7 is a section view taken at line 7—7 of FIG. 5;
FIG. 8 is an electrical schematic of a control system for the device when it is performing a stacking operation; and
FIG. 9 is an electrical schematic of a control system for the device when it is performing a de-stacking operation.

FIGS. 1, 2 and 3 show a frame 10 comprising two vertical racks 11 and 12 on opposite sides of a conveyance means 13 for transporting bins such as bin 14. Each rack supports a lift means 15 which is adapted to raise the bin off of, or lower the bin onto, the conveyance means depending upon whether it is being operated as a bin stacker or a bin de-stacker.

The conveyance means comprises two parallel tracks 16 and 17 disposed to transport bin 14. Tracks 16 and 17 each comprise roller bearings 18 linked together into the form of an endless chain 18a and driven by a track motor 69 (shown in FIGS. 8 and 9). Chains 18a are caused to ride in a guide such as channel 18b. Bin 14 rides upon the cylindrical surface of the roller bearings as the chains are driven in their guides thereby moving the bins along the conveyor.

Rack 11 comprises two vertical members 19 and 20 disposed adjacent track 16 and spaced from each other by a horizontal member 21 which is attached to the tops of members 19 and 20. Similarly, rack 12 on the opposite side of the conveyance means from rack 11 comprises two vertical members 22 and 23 disposed adjacent track 17 and separated from each other by a horizontal member 24 attached to the tops of members 22 and 23. A horizontal member 25 is attached to members 19 and 22 and extend across the conveyance means at a height such that there is ample clearance for a bin to pass underneath on the conveyor system.

Bin 14 has two horizontal flanges 26 and 27 extending outwardly on two opposing sides at the top of the bin. Lift means 15 on each rack is adapted to engage with flanges 26 and 27 to raise or lower the bin.

The lift means on racks 11 and 12 comprises two members in the forms of plates 28 and 29 which extend between the vertical members of their respective racks. Plates 28 and 29 ride in vertical runners 30 attached to the racks, as shown on member 20 in FIG. 2. Two dogs 33 and 34 are hinged at a pivot 34a at one of their ends on each plate, as shown in FIG. 4, and are rotatable to a position to engage with the flange of the bin.

Plates 28 and 29 are slidable in a vertical plane by a reversible drive means such as three-phase induction motor 35. In FIG. 3 motor 35 is shown to rotate a shaft 36 which is engaged to drive two chains 37 and 38 attached to the top 39 of plate 29 to raise and lower the plates. Chains 37 and 38 are each engaged to an idler sprocket wheel 40 and 41 and are attached at the other end to sprocket wheels 42 and 43 so that the chains will raise and lower the plates in a vertical plane. Wheels 42 and 43 are attached to shaft 36 and are of sufficient diameter such that within one revolution the plate will be moved the necessary distance for the stacking or de-stacking operation as will later be described. Plate 28 is moved by a chain drive arrangement similar to the arrangement for plate 29 shown in FIG. 3.

Dogs 33 and 34 have a flange engaging surface 48 which will abut the underside of flange 27 (shown in FIG. 4) when dog 34 is rotated in a counterclockwise direction from the position shown. Dogs 33 and 34 are rotated about pivot 34a. A control shaft 49 extends from vertical member 22 to vertical member 23 and is fixed to the dogs 49 at a distance from pivot points 34a. Vertical members 22 and 23 each have a vertical flange 50 at one edge substantially parallel with runners 30 and extending away from members 22 and 23 in the direction of the runners. A control level 51 in the shape of an elongated parallelogram is disposed between flange 50 and runner 30 and is attached to the vertical members at a pivot point 52 centrally located on lever 51. A groove 53 is formed around control level 51 bounded by flange 50 and runner 30 such that the ends of shaft 49 ride therein. A similar control arrangement of dogs 33 and 34 is attached to rack 11 between vertical members 19 and 20.

Control level 51 is attached to the vertical members 19, 20, 22 and 23 at substantially the same horizontal level as flange 27 on the bin 14 resting upon the conveyor. Control level 51 is spring-loaded at either one of two points, depending upon whether the device is used in a stacking or de-stacking operation.

When the device is being used for de-stacking a stack of bins, control lever 51 is spring-loaded by a tension spring 54 which, for the de-stacking operation, is placed at a point above pivot point 52 which tends to cause the lever to rotate in a clockwise direction, with reference to FIG. 4. When plate 29 is raised, dog 34 (shown in FIG. 4) will move upward beyond pivot point 53 in the groove between control lever 51 and runner 30. Dog 34 has sufficient weight to rotate counterclockwise after passing point 53 to oppose the tension of spring 54. Then, as plate 29 continues in an upward direction beyond control lever 51, shaft 49 will ride against flange 50 and dog 34 will engage the flange of an upper bin. The upper bin 14a rests on bin 14 and dog 34, in combination with the other dogs, will raise bin 14a off of bin 14. Then bin 14 will pass from between racks 11 and 12. The plates are then lowered and shaft 49 rides in groove 53 between lever 51 and flange 50. The upper bin 14a will then come to rest upon the conveyor and the plates will continue to be lowered causing shaft 40 to strike block 55 and the dogs to be rotated counterclockwise. The plates will then be automatically stopped.

When the device is used in a bin stacking operation instead of a de-stacking operation, the spring 54 is removed from its position above pivot 52, and is placed instead at a position at 54a below pivot 52 so that it tends to rotate lever 51 counterclockwise as shown in FIG. 4 by dotted lines 57. Then as plate 29 moves upward, dog 33 moves counterclockwise when shaft 49 strikes lever 51 and surface 48 contacts flange 27 of bin 14. The bin 14 is raised and another bin (not shown) moves between racks 11 and 12 on the conveyor system. Bin 14 is then lowered onto the second bin as the plates are lowered in the automatic operation.

The vertical movement of plates 28 and 29 is defined by the predetermined positioning of a control means, such as a contactor 59, attached on one side of plate 29 and operable to actuate two spring-loaded limit switches 60 and 61 attached to vertical member 23. The vertical displacement of the switches from the bottom of vertical member 23, as well as the distance between the switches, will determine the vertical movement of the plates. It is desired that the lift means be able to lift a bin vertically a substantial distance so that a second bin may move underneath it on the conveyor track with ample clearance.

There is employed in both the stacking and the de-stacking operation, a bin contacting means to inform a control mechanism of the device that a bin is between racks 11 and 12. Such means incorporates a bin contacting switch 62. Switch 62 comprises a spring-loaded roller 63 which extends into the path of travel of a bin riding upon the conveyor. Roller 63 is disposed at a position along the conveyor where it is operable by the bin as the bin reaches the desired position for the bin stacking or de-stacking operation; and when the roller is so operated it actuates switch 62. When switch 62 is actuated, the sequence of the control mechanism begins.

There is provided a bin feeler switch 64 (see FIGS. 1 and 3) used only when the device is operating as a stacker but not when operating as a de-stacker. Switch 64 is disposed vertically above the conveyor system and attached to a fixed member at a predetermined height. The predetermined height is determined by the height of the desired stack of bins ultimately to be conveyed from between racks 11 and 12 along the conveyor system. The switch will be actuated by the top bin on the stack as the stack is being made. For example, the preferred arrangement in accordance with the type bins presently used with this device in the citrus industry, is to stack the bins three high. As the stack is being raised to a height to accommodate the entry of the third bin between the racks, the top bin strikes switch 64 which will in turn inform the control mechanism the stack has been made.

When, on the other hand, the device is operated as a bin de-stacker, the switch 64 is not in use. Instead, use is made of a switch 65, it being understood that switch 65 is not in use when stacking. Switch 65 is disposed vertically above the conveyor system at a height substantially greater than the height of one bin but less than the height of two bins. The switch is disposed in a position where it is actuated as long as there is a stack of two or more bins between the racks and serves to inform the control mechanism that the bins have been de-stacked.

FIG. 5 shows a three-phase stop motor 72 operable to stop the bins at a desired position between racks 11 and 12 for the stacking operation while the conveyor is moving continuously. The stop motor is engaged with a shaft 74 disposed perpendicular to the direction of travel, denoted by arrow 75 shown in FIGS. 2 and 5, of this conveyor system 13 at the downstream end of the frame. Shaft 74 is mounted in journals 76 and 77 and has bin stopping lugs 78 and 79 attached thereon. Lugs 78 and 79 each have a protrusion 80 which extends above horizontal level of the conveyor track, as shown in FIG. 6, when shaft 74 is rotated so that protrusion 80 is vertically above shaft 74. Since the track motor 69 is caused to operate continuously, a bin riding upon the conveyor will strike lugs 78 and 79 and will be forced to remain between the racks for the entire bin stacking operation. A switch 81 shown in FIG. 7 is operable by a cam 82 mounted on shaft 74 and allows shaft 74 to rotate one-half revolution after the bin stack is made. The protrusions 80 will then be beneath shaft 74 and there will be ample clearance to allow the stack to move from between the racks upon the conveyor system.

FIG. 8 shows a control mechanism which is employed in the bin stacking operation in accordance with this invention. A three-phase A.C. power line comprising lines 66, 67 and 68 are attached to a three-phase track motor 69 to drive the conveyor system continuously. It is desired that the conveyor tracks 16 and 17 run continuously during the bin stacking operation so as not to slow down or stop the movement of the bins on the conveyor system which may cause costly delays in operations upstream on the conveyor.

Plates 28 and 29 will normally be in a lowered position in anticipation of receiving bins on the conveyor causing spring-loaded switch 61 to close against contact 85. Switch 64 normally closes a contact 86, except when a stack of three bins are between the racks. When an oncoming bin 14 enters between racks 11 and 12, it strikes stops 78 and 79, and at the same time actuates double-pole, double-throw switch 62 to close a contact 87. Relay 70 is then energized through closed contacts 87, 85, 86 and a normally closed contact 83a of a relay 83 to line 67. Relay 70 has three normally open contacts 88, 89 and 90 and a normally closed contact 91. Upon energizing relay 70, contacts 88, 89 and 90 will close and contact 91 will open.

Lift motor 35 is also a three-phase induction motor and may be reversible by reversing the polarity of two of its three-phase windings. This is done by employing two relays 70 and 71 operable to reverse the polarity. Lift motor 35 is connected to line 68 at a terminal 95, and contacts 89 and 90 connect lines 67 and 68 respectively to terminals 96 and 97 of the lift motor. The lift motor is energized when relay 70 is activated and causes plates 28 and 29 to be raised. Contactor 59 will then release switch 61 causing contact 85 to open, and closing a contact 98. Line 67 is broken at contact 85, but remains connected to relay 70 through a normally closed contact 99 of spring-loaded switch 60, a normally closed contact 100 of relay 71, and closed contact 88 of relay 70. As the plates rise, dogs 33 and 34 of plates 28 and 29 engage with the flanges 26 and 27 of bin 14 and the bin is raised. Contact 87 opens as the bin is raised off of roller 63 of switch 62. Bin 14 is continued to be raised until contactor 59 opens contact 99 of switch 60, because relay 70 is de-energized thereby opening contacts 88, 89, 90 and closing contact 91 causing motor 35 to stop. An automatically operated brake (not shown) is housed within motor 35 which will be actuated whenever the motor is not energized. The brake will hold shaft 74 to support the plate-supported bin while a second bin moves underneath on the conveyor closing contact 87 of switch 62 and being stopped by lugs 78 and 79.

When contact 87 of switch 62 closes, relay 71 is energized through contacts 87 and 98 of switches 62 and 61, respectively, and normally closed contact 91 of relay 70. Relay 71 has two normally open contacts 105 and 106 in addition to contact 100. Contacts 105 and 106 connect lines 66 and 67 to terminals 97 and 96, respectively, of lift motor 35. When contacts 105 and 106 are closed, the polarity of the A.C. line terminals 96 and 97 is reversed from the polarity at these terminals when relay 70 was energized. As a result, motor 35 will reverse its direction and lower the lift means thereby lowering bin 14. The bins are constructed so that bin 14 is supported on the flanges on top of its successive bin which followed on the conveyance system.

Lift motor 35 continues to lower the lift means after bin 14 has been placed on top of its successive bin. Dogs 33 and 34 of plates 28 and 29 are lowered below the flanges of the successive bin until contactor 59 strikes switch 61 causing contact 98 to open and contact 85 to close. When contact 98 opens, relay 71 will cease to be energized and the lift motor will stop. As contact 85 closes, relay 70 will be energized, as previously described, and lift motor 35 will again reverse its direction. The lift means raises the successive bin supporting bin 14 and contact 87 of switch 62 is opened. Switch 64 is disposed on the frame so as to be actuated by bin 14 as the two bins are raised by the lift means as previously described. Contact 86 will open and a contact 107 will close. When a third bin arrives at the desired point between the racks on the conveyor and closes contact 87, the lift means is again lowered, thereby lowering bin 14 and its successive bin onto the top of the third bin.

Contact 107 on switch 64 remains closed when the bins are stacked three high on the conveyor between the racks. The lift means is lowered again until contactor 59 opens contact 98 and closes contact 85. Relay 83 is then energized to open normally closed contact 83a, thereby disabling the lift motor 35 from the circuit. Relay 83 also has a normally open contact 108 which closes to act as a self-holding contact for relay 83. Contact 108 is connected in series with contact 87 to line 67 so that relay 83 will remain actuated until contact 87 is opened.

Switch 62 as used in the control mechanism of the bin stacker is a double-pole, double-throw switch having as a second pole, switch 109. Switches 62 and 109 are constructed to act together so that when switch 62 closes contact 87, switch 109 closes a contact 110. When 110 is closed, contact 107 is connected to a contact 111 on cam operated switch 81. When lugs 78 and 79 are in the raised position to stop the bins, switch 81 closes contact 111. Switch 81 is connected to a relay 73 having normally open contacts 112, 113 and 114 which connect stop motor 72 to the three-phase A.C. line. When three bins are stacked between racks 11 and 12 and the lift means is lowered to close contact 85 of switch 61, the relay 73 will be actuated and the stop motor will be energized. After motor 72 rotates shaft 74 one-half revolution, cam 82 causes switch 81 to open contact 111, thereby de-energizing relay 73 to stop motor 72.

Lugs 78 and 79 are rotated so that protrusions 80 are below shaft 74 and the stack of bins is allowed to proceed on the conveyor system. Once the stack of bins has passed from between the racks, switch 62 is released by stack opening contact 87 and closing a contact 118. Contact 118 is connected to a contact 119 which was closed by switch 81 when contact 111 was opened. Relay 73 is again actuated and motor 72 is energized through contacts 112, 113 and 114. Shaft 74 rotates another one-half revolution until cam 82 causes switch 81 to open contact 119 and close contact 111 again. After one-half revolution, protrusions 80 of the stopping lugs will again be disposed vertically above shaft 74 to stop the next succeeding bin to make another stack as previously described.

FIG. 9 shows a control mechanism which may be employed to operate the device as a bin de-stacker in accordance with this invention. The circuitry used to control the direction of rotation of lift motor 35 is substantially identical to that used in the bin stacker. Contactor 59 is operable to actuate switches 60 and 61 which in turn actuate relays 70 and 71, as described previously, to reverse the direction of lift motor 35 and raise and lower the lift means.

The bin de-stacker is best understood in the following description of its operation. Lift means 15 is normally in a lowered position so that contactor 59 causes switch 61 to close contact 85. A bottom bin, a middle bin, and a top bin stacked in that fashion enter between racks 11 and 12 in a direction denoted by arrow 125 shown in FIG. 2. The bottom bin strikes bin contacting switch 62, thus opening a contact 126 and the middle bin strikes switch 65 to close a contact 127. Contact 127 is connected to one side of relay 70 and a relay 128. Relay 70 is actuated and lift motor 35 is energized. Track motor 69 is energized through relay 128 having three normally open contacts 129, 130 and 131 connected to each line of the three-phase power line. The side opposite contact 127 connected to relay 128 is connected to line 68 of the A.C. line, thus relay 128 is actuated to open its contacts and stop track motor 69 whenever relay 70 is actuated.

In the de-stacking operation, spring 54 is placed above pivot point 52 as previously described. Dogs 33 and 34 remain substantially vertical until after passing flange 27 of the bottom bin and then rotate counterclockwise as previously described. Surfaces 48 of the dogs engage with flanges 26 and 27 of the middle bin as the lift means is raised, and thus raises the middle and top bin off of the bottom bin. Although switch 61 opens contact 85 and closes contact 98 when the lift means is raised, relay 128 will remain actuated to stop the track motor until contactor 50 opens switch 60 causing the lift motor to stop. Contacts 129, 130 and 131 will close and the track motor is energized again to drive the conveyor tracks and move the bottom bin from between the racks.

Switch 62 is then released by the bottom bin and contact 126 is closed. The lift means is then lowered to place the middle bin upon the conveyor tracks. When contactor 59 opens contact 98 and closes contact 85, the top bin bears against switch 65 causing contact 127 to be closed. The track motor is again stopped and the lift means releases the middle bin and then raises the top bin from the middle bin as previously described. After the middle bin moves from between the tracks, the top bin is lowered in the same manner, as previously described, onto the conveyor track and switch 65 opens contact 127. The top bin is transported from between racks 11 and 12 and the bin de-stacker is ready for the next stack of bins.

This invention is not limited to the particular embodiments described in the specification and illustrated in the drawings, which are given by way of illustration rather than limitation, and are only limited by the scope of the appended claims.

What is claimed is:

1. A bin de-stacking device comprising two racks adapted to receive a stack of bins comprising a first bin disposed on a second bin riding on a conveyor system, said bins each having an outwardly extending flange on opposite sides thereof, each of said racks being disposed on opposite sides of said conveyor track and provided with a reciprocating lift means and having a vertically disposed groove, said lift means comprising a plurality of dogs operable to engage with said flanges of said first bin when said stack is disposed between said racks, said dogs being attached to a plate slidably engaged on each of said racks to move in a vertical plane, a control shaft attached to said dogs adapted to ride in said groove on said rack as said plate moves vertically, said control shaft causing said dogs to be disposed away from said flanges of said second bin when said plate is moving in an upward direction, said control shaft causing said dogs to be engaged with said flanges of said first bin to lower said first bin onto said conveyor system when said plate is lowered.

2. A bin de-stacking device comprising two racks adapted to receive a stack of bins comprising a first bin disposed on a second bin riding on a conveyor system, each of said bins having an outwardly extending flange on opposite sides thereof, each of said racks being disposed on opposite sides of said conveyor track and provided with a reciprocating lift means and having a vertically disposed groove, said lift means being engaged to a shaft driven by a reversible motor, a limit switch in the path of the bins, said rotation of said shaft being reversible in direction by said limit switch operable to cause said lift means to reciprocate by said motor, said lift means comprising a plurality of dogs operable to engage with said flanges of said first bin when said stack is disposed between said racks, said dogs being attached to a plate slidably engaged on each of said racks to move in a vertical plane, a control shaft attached to said dogs adapted to ride in said groove on said racks as said plate moves vertically, said control shaft causing said dogs to be disposed away from said flanges of said second bin when said plate is moving in an upward direction and causing said dogs to be engaged with said flanges of said first bin to raise said first bin off of said second bin thereby actuating said limit switch, said second bin being transported from between said racks and said plates being lowered to lower said first bin to said conveyor system.

3. A bin stacking device comprising two racks and a stop means adapted to receive a first, second, and sequential bins continuously moving along a conveyor track, each of said bins each having an outwardly extending flange disposed on opposite sides of said bins, each of said racks being disposed on opposite sides of said conveyor track and provided with a reciprocating lift means and having a vertically disposed groove, said stop means restricting the passage of said bins on the conveyor track when said bins are disposed between said tracks, said lift means comprising a plurality of dogs operable to engage with a flange of each of said bins when said bins are disposed between said racks, said lift means being engaged to a shaft rotatable by a reversable motor, a limit switch in the path of the bins, said rotation of said shaft being reversed in direction by said limit switch operable to cause said lift means to reciprocate by reversing said motor, said dog being attached to a plate slidably engaged on each of said racks to move in a vertical plane, a control shaft attached to said dog and adapted to ride in said groove as said plate is moved vertically, said control shaft causing said dog to be engaged with the flanges of said first bin as said plates are raised thereby raising said first bin, said limit switch causing said motor to lower said lift means when said second bin is disposed between said racks thereby lowering said first bin onto said second bin to make a bin stack, said stop means releasing said stack of bins.

References Cited by the Examiner

UNITED STATES PATENTS

| | | | |
|---|---|---|---|
| 2,313,478 | 3/43 | Neja | 214—6.2 |
| 3,053,402 | 9/62 | Russell et al. | 214—6.2 |

FOREIGN PATENTS

| | | |
|---|---|---|
| 851,024 | 10/60 | Great Britain. |

HUGO O. SCHULZ, *Primary Examiner.*

UNITED STATES PATENT OFFICE
CERTIFICATE OF CORRECTION

Patent No. 3,190,466

June 22, 1965

Charles P. Hostetler

It is hereby certified that error appears in the above numbered patent requiring correction and that the said Letters Patent should read as corrected below.

Column 6, line 64, for "50" read -- 59 --; column 8, line 19, for "tracks" read -- racks --.

Signed and sealed this 21st day of December 1965.

(SEAL)
Attest:

ERNEST W. SWIDER
Attesting Officer

EDWARD J. BRENNER
Commissioner of Patents